(12) United States Patent
Kim

(10) Patent No.: US 10,626,820 B2
(45) Date of Patent: Apr. 21, 2020

(54) METHOD FOR DIAGNOSING VARIABLE VALVE TIMING SYSTEM

(71) Applicant: Hyundai Motor Company, Seoul (KR)

(72) Inventor: Yong Sik Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 280 days.

(21) Appl. No.: 15/364,077

(22) Filed: Nov. 29, 2016

(65) Prior Publication Data

US 2018/0051644 A1 Feb. 22, 2018

(30) Foreign Application Priority Data

Aug. 18, 2016 (KR) ........................ 10-2016-0104926

(51) Int. Cl.
| | | |
|---|---|---|
| *F02D 41/22* | (2006.01) | |
| *F02D 41/00* | (2006.01) | |
| *F01L 1/344* | (2006.01) | |
| *F01L 1/34* | (2006.01) | |
| *F01L 13/00* | (2006.01) | |

(52) U.S. Cl.
CPC .............. *F02D 41/222* (2013.01); *F01L 1/34* (2013.01); *F01L 1/344* (2013.01); *F01L 2001/3443* (2013.01); *F01L 2013/111* (2013.01); *F01L 2013/115* (2013.01); *F01L 2800/11* (2013.01); *F01L 2820/044* (2013.01); *F02D 2041/001* (2013.01); *F02D 2200/024* (2013.01); *Y02T 10/40* (2013.01)

(58) Field of Classification Search
None
See application file for complete search history.

(56) References Cited

U.S. PATENT DOCUMENTS

| | | | |
|---|---|---|---|
| 2002/0084897 A1* | 7/2002 | Shidara | ..................... F01M 1/16 340/451 |
| 2005/0257762 A1* | 11/2005 | Sawada | .................. F01L 1/022 123/90.17 |

FOREIGN PATENT DOCUMENTS

| | | | | |
|---|---|---|---|---|
| JP | 2004-293520 A | 10/2004 | | |
| JP | 4206793 B2 | 1/2009 | | |
| JP | 2009-203959 A | 9/2009 | | |
| JP | 2010-215183 A | 9/2010 | | |
| JP | 2010-275912 A | 12/2010 | | |
| JP | 2010275912 A | * 12/2010 | .............. F01L 1/344 |
| JP | 2012-159014 A | 8/2012 | | |
| JP | 2013-72303 A | 4/2013 | | |
| JP | 2013-199934 A | 10/2013 | | |

(Continued)

*Primary Examiner* — Jennifer E Simmons
*Assistant Examiner* — Ruben C Parco, Jr.
(74) *Attorney, Agent, or Firm* — Morgan, Lewis & Bockius LLP

(57) ABSTRACT

A method for diagnosing a variable valve timing system configured for enhancing precision of diagnosis regarding a variable valve timing system by precisely diagnosing whether an oil pressure detecting device of the variable valve timing system normally operates, may include a normal operation time determining operation of determining a normal operation time of an oil pressure detecting device to determine whether the oil pressure detecting device is normal after an engine starts, and a diagnosing operation of diagnosing whether the oil pressure detecting device is normal according to whether the oil pressure detecting device of the VVT system is turned off within the normal operation time or whether oil pressure reaches reference pressure.

3 Claims, 2 Drawing Sheets

(56) References Cited

FOREIGN PATENT DOCUMENTS

KR 10-1461901 B1 11/2014
WO WO 2013/166029 A1 11/2013

\* cited by examiner

METHOD FOR DIAGNOSING VARIABLE VALVE TIMING SYSTEM

CROSS-REFERENCE TO RELATED APPLICATION

The present application is based on and claims the benefit of priority to Korean Patent Application No. 10-2016-0104926, filed on Aug. 18, 2016, in the Korean Intellectual Property Office, the entire contents of which is incorporated herein for all purposes by this reference.

FIELD OF THE INVENTION

The present invention relates to a variable valve timing system, and more particularly, to a method for diagnosing a variable valve timing system configured for enhancing precision of diagnosis regarding a variable valve timing system by precisely diagnosing whether an oil pressure detecting device of the variable valve timing system normally operates.

BACKGROUND

As known, a variable valve timing system is configured at the engine to vary a valve timing (time for opening and closing an intake valve and an exhaust valve) of the intake valve and the exhaust valve according to engine conditions for enhancing fuel efficiency and output.

Also, as the variable valve timing system controls a valve timing, fuel efficiency and output performance may be enhanced and an emission reduction effect may be improved by lengthening valve overlap (a state in which both an intake valve and an exhaust valve are open) by the variable valve timing system during a catalyst heating section, an internal exhaust gas recirculation (EGR) rate may be increased to increase recombustion combustion of imperfect combustion gas and a temperature of a mixer to increase evaporation of fuel, whereby emission may be reduced.

In this manner, since the variable valve timing system is also related to an exhaust gas reducing device, self-diagnosis based on on-board diagnostics (OBD)-2 regulations is required.

That is, it is required to stably maintain emission reduction performance by diagnosing whether the variable valve timing system has a fault.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for diagnosing a variable valve timing system configured for enhancing diagnosis precision of the variable valve timing system by precisely diagnosing whether an oil pressure detecting device of the variable valve timing system normally operates.

According to an exemplary embodiment of the present invention, a method for diagnosing a variable valve timing (VVT) system includes: a normal operation time determining operation of determining a normal operation time of an oil pressure detecting device to determine whether the oil pressure detecting device is normal after an engine starts; and a diagnosing operation of diagnosing whether the oil pressure detecting device is normal according to whether the oil pressure detecting device of the VVT system is turned off within the normal operation time or according to whether oil pressure reaches reference pressure within the normal operation time.

In the diagnosing operation, when the oil pressure detecting device is turned off or when the oil pressure reaches the reference pressure in a case in which a time which has lapsed after the engine started is within the normal operation time, the oil pressure detecting device may be diagnosed to be normal.

In the diagnosing operation, when the time which has lapsed after the engine started exceeds the normal operation time, a forcible operation command signal may be provided to the VVT system, and when the VVT system normally operates according to the forcible operation command signal, the oil pressure detecting device may be diagnosed to have a fault.

When the VVT system does not normally operate according to the forcible operation command signal, an oil supply device may be diagnosed to have a fault.

The normal operation time may be determined according to a temperature of a coolant of the engine and a soak time.

The normal operation time may be determined according to a temperature of a coolant of the engine, a soak time, and a temperature or viscosity of oil.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
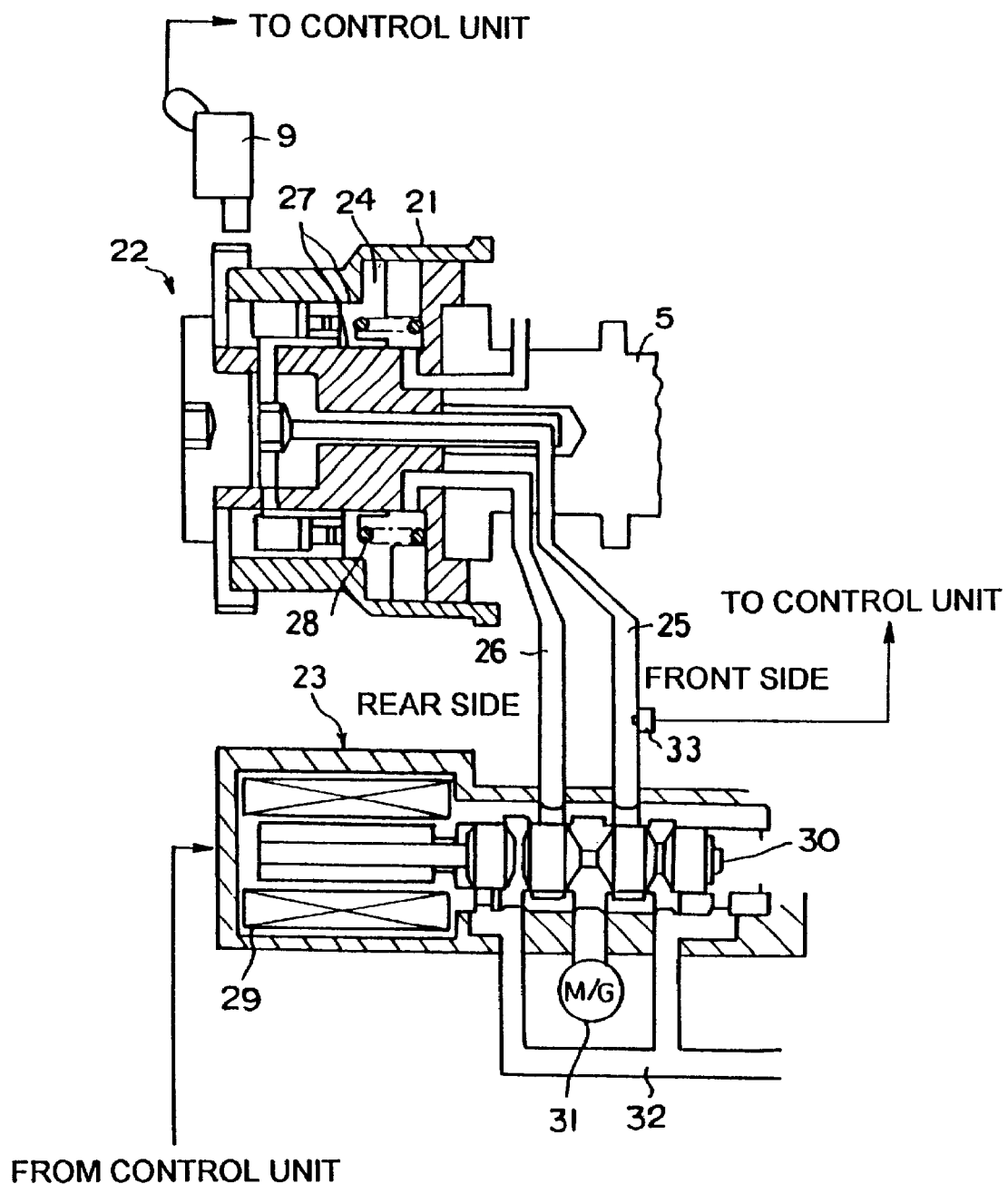
FIG. 1 is a view illustrating a variable valve timing system.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a view illustrating a variable valve timing system.

Referring to FIG. 1, the variable valve timing system may include an actuator 22 mounted in a cam sprocket 21 of a cam shaft 5 and an oil control valve 23 adjusting a flow direction of oil supplied from an oil tank to the actuator 22.

The actuator 22 may be configured to change a phase between a crank shaft of an engine and the cam shaft 5, and accordingly, a rotational phase of a cam mounted at the cam shaft 5 may be changed to adjust opening and closing of an intake valve and/or an exhaust valve. A front side hydraulic passage 25 and a rear side hydraulic passage 26 are mounted in the actuator 22. The front side hydraulic passage 25 may be configured to supply oil to a front side of a plunger 24 mounted within the cam sprocket 21, and the rear side hydraulic passage 26 may be configured to supply oil to a rear side of the plunger 24.

The plunger 24 may be coupled to the cam sprocket 21 and the cam shaft 5 through a helical gear 27. The plunger 24 may be rotatably moved along an axial line direction of the cam shaft 5 according to balance of oil supplied to the front side and the rear side of the plunger 24. The plunger 24 may be rotated together with the cam shaft 5, and accordingly, a phase position between the cam sprocket 21 and the cam shaft 5 may be changed. For example, when the plunger 24 moves toward the cam shaft 5, a rotation phase of the cam shaft 5 is changed to a phase advance direction, and when the plunger 24 moves away from the cam shaft 5, the rotation phase of the cam shaft 5 may be changed to a phase retard direction.

Also, a return spring 28 forcing the plunger 24 to move away from the cam shaft 5 (phase retard direction) may be provided.

The oil control valve 23 may be configured to control a flow direction of oil supplied to the front side or the rear side of the plunger 24.

The oil control valve 23 may have a linear solenoid 29 and a spool valve 30. The linear solenoid 29 converts a position of the spool valve 30, whereby oil is supplied to the front side of the plunger 24 through the front side hydraulic passage 25 and oil may be supplied to the rear side of the plunger 24 through the rear side hydraulic passage 26.

An oil pump 31, a drain passage 32, and the like, may be connected to the oil control valve 23. Also, a cam sensor 9 detecting an angle of the cam shaft 5 may be mounted.

Also, an oil pressure detecting device 33 (an oil pressure sensor or an oil pressure switch) may be mounted in a flow path of oil, for example, in at least one of the front side hydraulic passage 25 and the rear side hydraulic passage 26, to detect oil pressure.

To diagnose whether the variable valve timing system normally operates, sufficient oil pressure is required, and thus, whether the oil pressure detecting device 33 normally operates may be precisely diagnosed according to whether the oil pressure detecting device 33 is turned off within a predetermined time or whether oil pressure detected by the oil pressure detecting device 33 reaches reference pressure.

Figure 2:
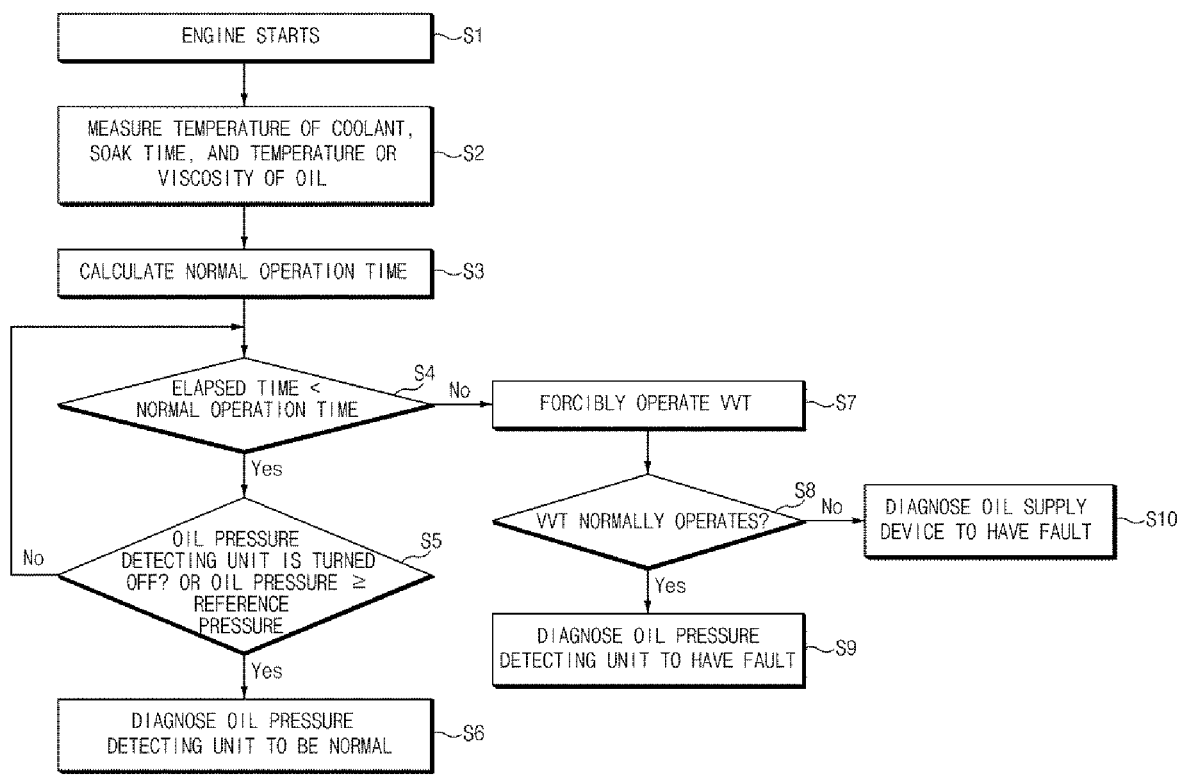
FIG. 2 is a flow chart illustrating a method for diagnosing a variable valve timing system according to various exemplary embodiments of the present invention.

FIG. 2 is a flow chart illustrating a method for diagnosing a variable valve timing system according to various exemplary embodiments of the present invention.

Referring to FIG. 2, an engine may start in operation S1 and a timer is simultaneously turned on to detect a time which has elapsed after the engine was started.

A temperature of a coolant of the engine, a soak time after the engine is tuned off, a temperature or viscosity of oil, and the like, are measured in operation S2.

A time at which the oil pressure detecting device 33 is turned off or a time at which oil pressure detected by the oil pressure detecting device 33 reaches the reference pressure, that is, a "normal operation time" of the oil pressure detecting device 33, when the oil pressure detecting device 33 of the variable valve timing (VVT) system is in a normal state is determined in operation S3. Here, the reference pressure is a reference value for determining whether the VVT system or the oil pressure detecting device 33 is normal.

The "normal operation time" may be determined through a map variously mapped according to the temperature of a coolant of the engine, the soak time, the temperature or viscosity of oil, and the like, or an empirical formula, and the like.

Thereafter, it is determined whether a time which may have lapsed since the engine was started (checked through a timer in real time) is within the "normal operation time" in operation S4.

When the time which has lapsed since the engine was started is smaller than the "normal operation time" (that is, when the elapsed time is within the "normal operation time") in operation S4, it is determined whether the oil pressure detecting device 33 is turned off or whether the oil pressure detected by the oil pressure detecting device 33 reaches the reference pressure in operation S5.

When the oil pressure detecting device 33 is turned off or when the oil pressure detected by the oil pressure detecting device 33 reaches the reference pressure (when the oil pressure is equal to or greater than the reference pressure) in operation S5, the oil pressure detecting device 33 is diagnosed to be normal in operation S6.

When the oil pressure detecting device 33 is not turned off or when the oil pressure detected by the oil pressure detecting device 33 does not reach the reference pressure in operation S5, the process is returned to operation S4 as mentioned above.

Also, when the elapsed time is greater than the "normal operation time" (that is, when the elapsed time exceeds the "normal operation time") in operation S4, a controller provides a forcible operation command signal to the VVT system in operation S7.

It is determined whether the VVT system normally operates according to the forcible operation command signal of the VVT system in operation S8.

When the VVT system normally operates according to the forcible operation command signal of the VVT system, a fault of the oil pressure detecting device 33 may be diagnosed in operation S9.

Meanwhile, when the VVT system does not normally operate according to the forcible operation command signal of the VVT system, a fault of an oil supply device including the oil control valve 23, the oil pump 31, and the like, may be diagnosed in operation S10.

As described above, according to an exemplary embodiment of the present invention, a normal operation of the VVT system may be precisely diagnosed according to whether the oil pressure detecting device is turned off within a normal operation time or whether oil pressure reaches an arrival time.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A method for diagnosing a variable valve timing (VVT) system, the method comprising:
 a normal operation time determining operation of determining a normal operation time of an oil pressure detecting device to determine whether the oil pressure detecting device is normal after an engine starts; and
 a diagnosing operation of diagnosing whether the oil pressure detecting device is normal according to whether oil pressure reaches a reference pressure within the normal operation time,
 wherein, in the diagnosing operation,
 in a response that a time which has lapsed after the engine started exceeds the normal operation time, a forcible operation command signal is provided to the VVT system, and
 in a response that the VVT system normally operates according to the forcible operation command signal, the oil pressure detecting device is diagnosed to have a fault,
 wherein the normal operation time is determined according to a temperature of a coolant of the engine, a soak time, and a temperature of oil.

2. The method according to claim 1, wherein, in the diagnosing operation, when the oil pressure reaches the reference pressure in a case in which a time which has lapsed after the engine started is within the normal operation time, the oil pressure detecting device is diagnosed to be normal.

3. The method according to claim 1, wherein, in the diagnosing operation,
 when the VVT system does not normally operate according to the forcible operation command signal, an oil supply device is diagnosed to have a fault.

* * * * *